US010575172B2

(12) United States Patent
Ikeda et al.

(10) Patent No.: US 10,575,172 B2
(45) Date of Patent: Feb. 25, 2020

(54) METHOD AND SYSTEM FOR SETTING SMARTPHONE ACCOUNT

(71) Applicant: FREEBIT CO., LTD., Tokyo (JP)

(72) Inventors: Hiroki Ikeda, Tokyo (JP); Atsuki Ishida, Tokyo (JP); Hiroshi Oizumi, Tokyo (JP); Jo Sakai, Tokyo (JP)

(73) Assignee: Freebit Co., LTD., Tokyo (JP)

( * ) Notice: Subject to any disclaimer, the term of this patent is extended or adjusted under 35 U.S.C. 154(b) by 380 days.

(21) Appl. No.: 15/323,923

(22) PCT Filed: Jul. 6, 2015

(86) PCT No.: PCT/JP2015/069426
§ 371 (c)(1),
(2) Date: Jan. 4, 2017

(87) PCT Pub. No.: WO2016/002969
PCT Pub. Date: Jan. 7, 2016

(65) Prior Publication Data
US 2017/0134949 A1 May 11, 2017

(30) Foreign Application Priority Data
Jul. 4, 2014 (JP) .................................. 2014-138582

(51) Int. Cl.
H04W 12/06 (2009.01)
G06F 21/44 (2013.01)
(Continued)

(52) U.S. Cl.
CPC ............ H04W 12/06 (2013.01); G06F 21/31 (2013.01); G06F 21/44 (2013.01);
(Continued)

(58) Field of Classification Search
CPC ..... H04W 12/06; H04W 12/44; H04W 12/08; H04L 63/0272; H04L 63/08; H04L 63/18;
(Continued)

(56) References Cited

U.S. PATENT DOCUMENTS 5,887,249 A    3/1999  Schmid
7,577,427 B2 * 8/2009  Bicker ..................... H04W 4/16
                                                370/259

(Continued)

FOREIGN PATENT DOCUMENTS

CN    1863214 A   11/2006
CN    103259812 A   8/2013
(Continued)

OTHER PUBLICATIONS

Daisuke Takahashi, Yoshinoi Takada, Eiichi Horiuchi, "A study of Automatic configuration for remote Access to Home Network", Proceedings of the 2013 IEICE General Conference Tsushin 2, Mar. 5, 2013, p. 170.

(Continued)

Primary Examiner — Huan V Doan
(74) Attorney, Agent, or Firm — Thorpe North and Western, LLP; David W. Osborne

(57) ABSTRACT

According to the present invention, there is provided a method for setting up a cloud account for a mobile operating system on a smartphone equipped with the mobile operating system, comprising the steps of: (1) connecting to a support service providing server by the smartphone, (2) authenticating the smartphone by the support service providing server; (3) remotely accessing the smartphone by the support service providing server to thereby obtain a cloud account from a cloud service providing server through the smartphone; and (4) performing identity validation for the cloud account by the support service providing server between the support (Continued)

service providing server and the cloud service providing server.

14 Claims, 3 Drawing Sheets

(51) Int. Cl.
    *H04W 12/08*     (2009.01)
    *G06F 21/31*     (2013.01)
    *H04L 29/06*     (2006.01)

(52) U.S. Cl.
    CPC .......... *H04L 63/0272* (2013.01); *H04L 63/08* (2013.01); *H04W 12/08* (2013.01); *G06F 2221/2117* (2013.01); *H04L 63/18* (2013.01)

(58) Field of Classification Search
    CPC ... G06F 21/31; G06F 2221/2117; G06F 21/44
    See application file for complete search history.

(56) References Cited

U.S. PATENT DOCUMENTS

| | | | |
|---|---|---|---|
| 9,317,672 B2* | 4/2016 | Carlson | G06F 21/31 |
| 2013/0132854 A1* | 5/2013 | Raleigh | G06F 3/0482 |
| | | | 715/738 |
| 2014/0068787 A1* | 3/2014 | Steigmann | G06F 21/41 |
| | | | 726/28 |
| 2014/0082695 A1* | 3/2014 | Alsina | H04L 29/06 |
| | | | 726/3 |
| 2014/0194091 A1* | 7/2014 | Gopalakrishnan | G06Q 30/06 |
| | | | 455/406 |
| 2014/0295956 A1* | 10/2014 | Katz | G07F 17/3241 |
| | | | 463/29 |

FOREIGN PATENT DOCUMENTS

| | | |
|---|---|---|
| JP | 2000-504511 A | 4/2000 |
| WO | 97/28665 | 8/1997 |

OTHER PUBLICATIONS

Search Report and Written Opinion for International Patent Application PCT/JP2015/069426 filed Jul. 6, 2015; dated Sep. 1, 2015; 10 pages total including English translation.

* cited by examiner

METHOD AND SYSTEM FOR SETTING SMARTPHONE ACCOUNT

FIELD OF THE INVENTION

The present invention relates to a method and a system for setting up a cloud account for a smartphone equipped with a mobile operating system.

BACKGROUND OF THE INVENTION

In recent years, so-called "smartphones" have been rapidly becoming prevalent.

A smartphone is a hand-held computer with a telephone communication function enabled by a general purpose mobile operating system (OS) such as Android™ or iOS™, installed on the smartphone. On the smartphone, various applications (hereafter referred to as "apps") provided by third parties may be downloaded and installed from a cloud service providing server which interfaces with the OS. However, installation of such an app requires an initial setup including an account (cloud account) setup for connecting to the cloud service providing server, requiring certain knowledge about computers in general.

Accordingly, there are mobile phone operators offering to perform the OS initial setup which includes generating a cloud account when handing a smartphone to a user who does not have enough computer knowledge.

Incidentally, in recent years, forms of smartphone sales are diversifying and, for example, there are more and more cases where a smartphone is purchased by mail order through the Internet, in which case, a sales person cannot be physically present next to a subscriber and operate on the smartphone purchased by the subscriber.

Whereas, if a typical remote operation app may be used, it is possible to perform various setups on the subscriber's smartphone through the remote operation, but this method may not be employed because normally a cloud account must be set up in order to enable downloading and installing new apps.

Considering the above situation, the purpose of the present invention is to provide a method and a system for processing a cloud account setup necessary for a smartphone.

SUMMARY OF THE INVENTION

In order to achieve the above object, according to a first aspect of the present invention, there is provided a method for setting up a cloud account for a mobile operating system on a smartphone equipped with the mobile operating system, comprising the steps of: (1) connecting to a support service providing server by the smartphone, wherein the support service providing server stores therein smartphone-specific information and user information associated with the smartphone-specific information; (2) receiving the smartphone-specific information from the smartphone and authenticating the smartphone by the support service providing server; (3) remotely accessing the smartphone by the support service providing server to thereby connect to a cloud service providing server through the smartphone and using the user information to obtain a cloud account; and (4) performing identity validation for the cloud account by the support service providing server between the support service providing server and the cloud service providing server.

According to such a configuration, a smartphone may be remotely operated before setting up its cloud account, and even when, for example, a sales person cannot be physically present next to a subscriber and operate on the subscriber's smartphone, a cloud account may be set up for the smartphone by a remote server of the smartphone seller.

Here, according to one embodiment, the user information preferably includes e-mail address information of a user and desired authentication information for the cloud account. In this case, the step (4) is preferably performed by sending an identity validation e-mail to the e-mail address of the user from the cloud service providing server.

Also according to another embodiment, in the step (1), the smartphone connects to the support service providing server over a VPN. In this case, the smartphone preferably connects to the support service providing server over a VPN through a tunneling connection. Also in this case, the smartphone preferably stores therein an IP address of the support service providing server.

According to yet another embodiment, the smartphone-specific information is a telephone number of the smartphone.

Further according to a second principal aspect of the present invention, there is provided a system for setting up a cloud account for a mobile operating system on a smartphone equipped with the mobile operating system, comprising: (1) a unit for connecting to a support service providing server by the smartphone, wherein the support service providing server stores therein smartphone-specific information and user information associated with the smartphone-specific information; (2) a unit for receiving the smartphone-specific information from the smartphone and authenticating the smartphone by the support service providing server; (3) a unit for remotely accessing the smartphone by the support service providing server to thereby connect to a cloud service providing server through the smartphone and using the user information to obtain a cloud account; and (4) a unit for performing identity validation for the cloud account by the support service providing server between the support service providing server and the cloud service providing server.

Characteristics of the present invention other than the claimed characteristics will be disclosed in the following description of the preferred embodiments and the accompanying drawings.

DETAILED DESCRIPTION OF THE INVENTION

One embodiment of the present invention will be described below in accordance with accompanying drawings.

Figure 1:
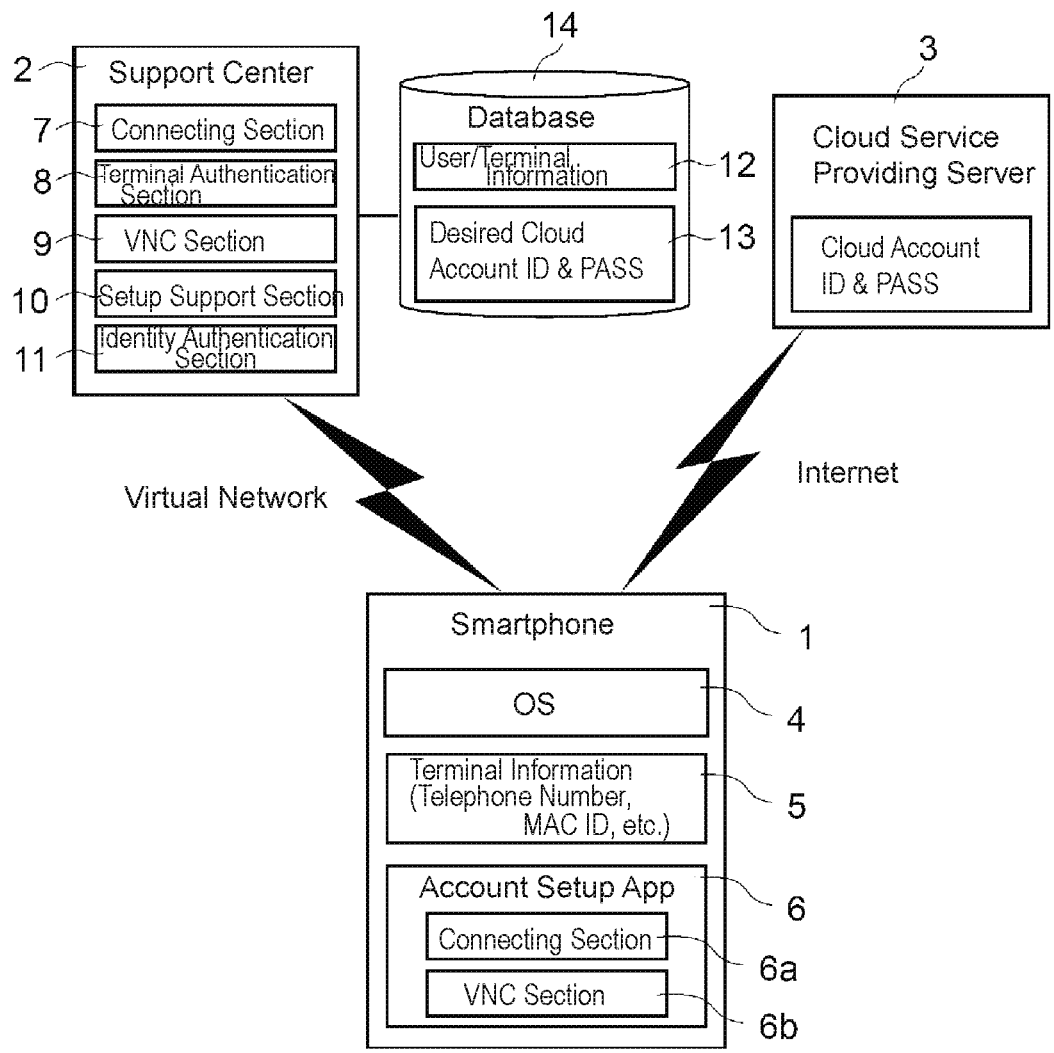
FIG. 1 is an overall schematic structural view showing an overall configuration of a system according to an embodiment of the present invention.

FIG. 1 shows a system configuration of the present embodiment.

Indicated with 1 in this figure is a smartphone newly purchased by a subscriber; indicated with 2 is a support center server (support service providing server) provided at a smartphone seller who is a smartphone carrier; and indicated with 3 is a cloud service providing server for interfacing with the smartphone and allowing the subscriber to download various apps.

Preinstalled on the smartphone 1 are a mobile operating system (OS) 4, a terminal identification information 5 such as a telephone number and the like, and a cloud service account setup app 6, which runs on the OS 4. Also, the cloud service account setup app 6 comprises a connecting section 6a for connecting the app 6 to the support center server 2 via a tunneling connection, and a VNC section 6b for providing the support center server 2 with a screen sharing control over the smartphone through VNC.

The support center server 2 is provided with a connecting section 7 for interfacing with the cloud service account setup app 6 and establishing a VPN via tunneling connection with the smartphone 1; a terminal authentication section 8 for authenticating the smartphone 1; a VNC section 9 for obtaining the screen sharing control over the smartphone 1 through a VNC connection; an account setup support section 10 for connecting with the cloud service providing server 3 via the VNC connection and setting up a cloud account; an identity authentication section 11 for performing identity validation on the smartphone 1. Also, this support center server 2 is connected with a database 14 for storing therein, terminal information (e.g., telephone number and MAC identification symbol) for authenticating the smartphone 1 and user information (name, address, e-mail address) 12, desired cloud account name and password 13 for generating a cloud account.

A configuration of the above system will be disclosed in detail below by describing the system's operations.

Figure 2:
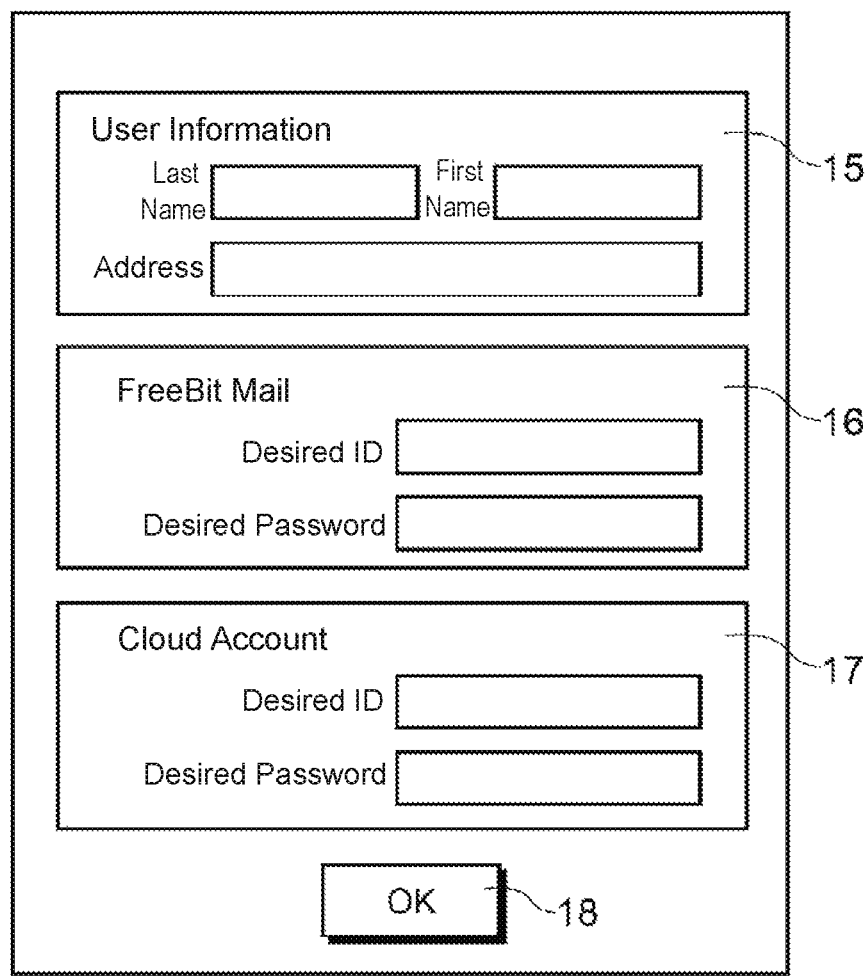
FIG. 2 is a schematic diagram showing a setup screen according to the embodiment of the present invention.

In this embodiment, the smartphone 1 is provided by a smartphone seller, for example, through a mail-order house such as a TV shopping operator. In so doing, the setup support section 10 of the support center server 2 displays a dedicated Web page such as one shown in FIG. 2 on a user's PC browser, and prompts the user to enter information required for setting up a new contract and a cloud account.

In other words, this Web page provides input fields for subscriber information 15 for the subscriber's name, address, etc., input fields for desired e-mail address ID and password 16 from a seller (Feebit.com in this example) domain, and input fields for desired cloud account ID and password 17; and when the user enters these pieces of information and presses an OK button 18, the information will be sent to the support center server 2 and stored in the database 14.

Next, the support center server 2 allocates a new subscriber telephone number to the smartphone 1 (user) and then, the smartphone 1 is sent to the new user's address. Also, the above server 2 sets up a dedicated e-mail address (e.g., <telephone number/subscriber's name>@<seller's e-mail server domain>) for the smartphone 1 based on the information entered in the input fields 16 (the desired e-mail address ID and password), and stores the e-mail address in the database 14 and the smartphone 1.

Figure 3:
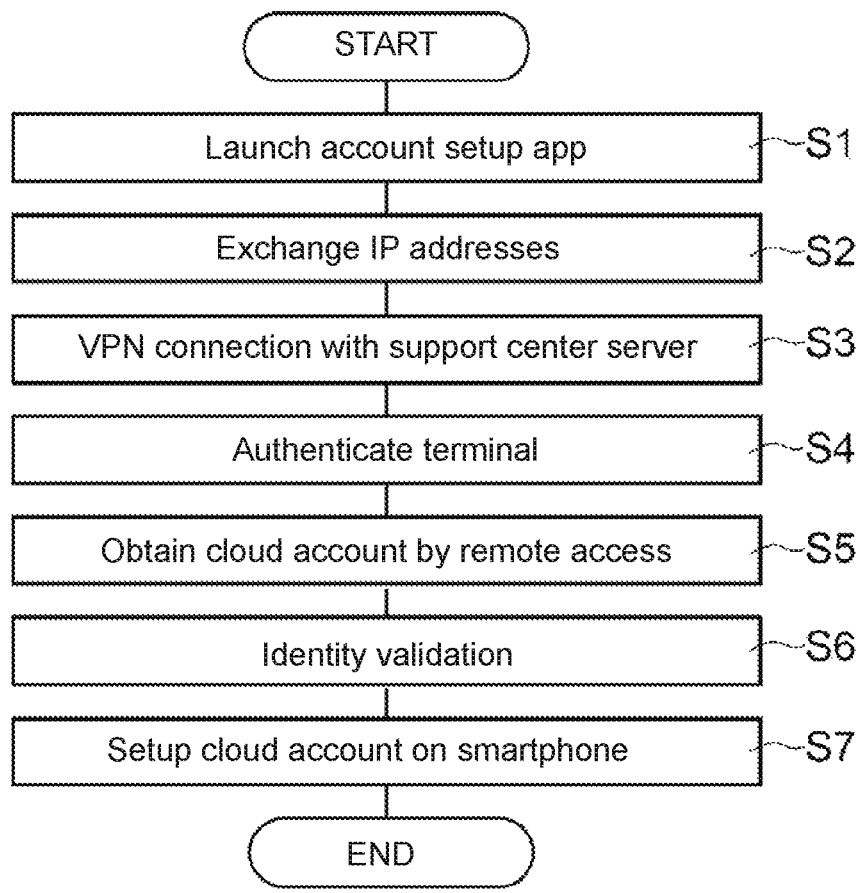
FIG. 3 is a flowchart showing a setup flow according to the embodiment of the present invention.

Next, operations of the smartphone 1 during its initial setup will be discussed with reference to a flowchart of FIG. 3.

First, the new subscriber who received the smartphone 1 launches the smartphone 1 as well as the cloud account setup app 6 on this smartphone 1 (Step S1). The connecting section 6a of this setup app 6 stores therein a global IP address of the support center server 2, uses the global IP address to send a global IP address of the smartphone 1 to the connecting section 7 of the support center server 2 (Step S2), and establishes a tunneling connection with TCP/IP between the smartphone 1 and the server 2 to thereby build a VPN (Step S3).

Then, the account setup app 6 of the smartphone 1 sends the smartphone's telephone number to the support center server 2, where the terminal authentication section 8 of the support center server 2 performs terminal authentication (Step S4). Specifically, the terminal authentication section 8 checks if the received telephone number and the telephone number stored in the database 14 of the support center server 2 match, and if they do, it notifies the smartphone 1 accordingly and ends the authentication. Then, the VNC sections 6b and 9 of the app 6 and the server 2, respectively, provide VNC (virtual network computing) to allow the support center server 2 to remotely connect to the smartphone 1 and perform the screen sharing control. Subsequently, the setup support section 10 accesses the cloud service providing server 3 via the smartphone 1 and starts generating a cloud account.

Specifically, the account setup support section 10 of the support center server 2 retrieves the subscriber's name and address associated with the authenticated telephone number from the database 14, and sends the subscriber's name and address to the cloud service providing server 3 through the setup screen of the smartphone for a cloud account setup. At this point, as a contact telephone number or an e-mail address for identity validation, the telephone number of the smartphone 1 stored in the database 14 and the e-mail address provided by the seller are sent to the cloud service providing server 3.

Also, for an ID for the cloud account, the user-specified ID and password stored in the database 14 of the server 2 are retrieved from the database 14 and sent to the cloud service providing server 3.

Thus, by the smartphone 1 being remotely operated by the server 2, the information required for generating a cloud account is sent to the cloud service providing server 3. During this processing, the user of the smartphone 1 does not have to do anything other than launching the app 6, but in some cases, an option such as an ability to change the account ID or password, or to verify the processing using an OK button may be provided to the user.

Next, the cloud service providing server 3 processes the account request to generate an account and then, the support center server 2 sends a confirmation e-mail to the above e-mail account. The app 6 and the setup section 10 are configured with an ability to confirm the receipt of the above e-mail to thereby enable the subscriber's identity validation (Step S6).

With the above operations, the cloud account ID and password are set to the smartphone 1 (Step S7).

According to such a configuration, a smartphone may be remotely operated before setting up its cloud account, and even when, for example, a sales person cannot be physically present next to a subscriber and operate on the subscriber's smartphone, a cloud account may be set up for the smartphone by a remote server of the smartphone seller.

It should be noted that the present invention is not limited to the above one embodiment, and that various changes and modifications may be made without departing from the spirit and scope of the present invention.

For example, in the above one embodiment, the account setup app 6 was pre-installed, but it may be downloaded after the VPN connection from an external server such as the server 2.

Also as for the terminal authentication, other than sending the telephone number, a terminal identification number (International Mobile Equipment Identity: IMEI) and/or terminal location information may be sent to ensure the authentication of the ordered terminal and the subscriber identity.

Further, during the cloud account generating, an "OK" button may be pressed by the user.

What is claimed is:

1. A method for setting up a cloud account for a mobile operating system on a smartphone equipped with the mobile operating system, the method comprising the steps of:
    (1) connecting to a support service providing server by the smartphone, wherein the support service providing server is configured to store therein smartphone-specific information and user information associated with the smartphone-specific information;
    (2) receiving, at the support service providing server, the smartphone-specific information from the smartphone and authenticating the smartphone;
    (3) obtaining a screen share control of the smartphone, by the support service providing server, via a virtual network computing connection, and remotely accessing the smartphone to thereby connect to a cloud service providing server through the smartphone to obtain the cloud account using the user information; and
    (4) performing, by the support service providing server, identity validation for the cloud account with the cloud service providing server;
wherein the smartphone stores therein an address of the support service providing server, wherein the address is uniquely identifiable in the Internet.

2. The method of claim 1, wherein
the user information includes e-mail address information of a user and desired authentication information for the cloud account.

3. The method of claim 2, wherein
the identity validation for the cloud account is performed by sending an identity validation e-mail to the e-mail address information of the user from the cloud service providing server.

4. The method of claim 1, wherein
the smartphone connects to the support service providing server over a Virtual Private Network (VPN).

5. The method of claim 4, wherein
the smartphone connects to the support service providing server over a VPN through a tunneling connection.

6. The method of claim 1, wherein
the address is an Internet Protocol (IP) address.

7. The method of claim 1, wherein
the smartphone-specific information is a telephone number of the smartphone.

8. A system for setting up a cloud account for a mobile operating system on a smartphone equipped with the mobile operating system, the system comprising:
    the smartphone; and
    a support service providing server;
    wherein:
    the smartphone is configured to connect to the support service providing server, and to store an address of the support service providing server, wherein the address is uniquely identifiable in the Internet; and
    the support service providing server is configured to:
        receive smartphone-specific information from the smartphone;
        store the smartphone-specific information and user information associated with the smartphone-specific information;
        authenticate the smartphone with the support service providing server;
        obtain a screen share control of the smartphone, via a virtual network computing connection, and remotely access the smartphone to thereby connect to a cloud service providing server through the smartphone and obtain the cloud account using the user information; and
        perform an identity validation for the cloud account with the cloud service providing server.

9. The system of claim 8, wherein
the user information includes e-mail address information of a user and desired authentication information for the cloud account.

10. The system of claim 9, wherein
the identity validation is performed by sending an identity validation e-mail to the e-mail address information of the user from the cloud service providing server.

11. The system of claim 8, wherein
the smartphone connects to the support service providing server over a Virtual Private Network (VPN).

12. The system of claim 11, wherein
the smartphone connects to the support service providing server over a VPN through a tunneling connection.

13. The system of claim 8, wherein
the address is an Internet Protocol (IP) address.

14. The system of claim 8, wherein
the smartphone-specific information is a telephone number of the smartphone.

* * * * *